(12) United States Patent
Gieseke

(10) Patent No.: US 6,837,175 B1
(45) Date of Patent: Jan. 4, 2005

(54) ASYMMETRIC TOW SYSTEM FOR MULTIPLE LINEAR SEISMIC ARRAYS

(75) Inventor: Thomas J. Gieseke, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/627,103

(22) Filed: Jul. 24, 2003

(51) Int. Cl.[7] .............................................. B63B 21/56
(52) U.S. Cl. ...................................................... 114/242
(58) Field of Search ................................. 114/242, 243, 114/253, 254

(56) References Cited

U.S. PATENT DOCUMENTS 4,726,314 A * 2/1988 Ayers .......................... 114/243
5,367,971 A * 11/1994 Carpenter et al. .......... 114/243
5,835,450 A * 11/1998 Russell ......................... 367/20
5,913,280 A * 6/1999 Nielsen et al. .............. 114/242

* cited by examiner

*Primary Examiner*—Stephen Avila
(74) *Attorney, Agent, or Firm*—James M. Kasischke; James M. Kasischke; Michael F. Oglo

(57) ABSTRACT

An asymmetric towing system for towing multiple linear arrays includes a tow platform and a single composite tow cable extending from the tow platform and having the multiple linear arrays connected both mechanically and electrically thereto. The composite tow cable is shaped by a hard streamlined casing and houses a load bearing cable for mechanical connection to each array and plural individual array connections for establishing electrical communication between each array and the tow platform. A single depressor is connected to a distal end of the composite cable for spreading the composite cable in a substantially lateral direction from and to one side of the tow platform.

15 Claims, 1 Drawing Sheet

ASYMMETRIC TOW SYSTEM FOR MULTIPLE LINEAR SEISMIC ARRAYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to a device for towing long multiple line arrays.

More particularly, the invention relates to a device for towing long multiple linear arrays with a streamlined composite tow cable, with the composite tow cable having direct mechanical and electrical connections to each towed array.

The array towing arrangement and bridle configuration present minimal drag to the tow platform and consequently the proposed arrangement can be towed at greater speeds than other more traditional towing arrangements. The reduced drag enables higher tow speed and in turn more rapid coverage of large areas of the ocean floor.

(2) Description of the Prior Art

The current art for undersea oil exploration is guided by seismic analysis of the ocean floor. Large surface ships 90 tow multiple linear arrays 92 equipped with low frequency acoustic transmitters and receivers (see FIG. 1). An array catenary 94 trails from the tow platform/ship 90 and is supported by interconnecting cables 96 at a location of a pair of depressors 98, one at each of the outer spread of the interconnecting cables 96 as shown. These arrays 92 send powerful seismic impulses into the sea floor. The received echo provides information about the geological make-up of the ocean floor and also provides indications as to the location of natural resources. The individual linear arrays 92 can be many miles long and the bridle holding many arrays can be several miles wide. The combined drag of the required depressors 98, interconnecting cables 96, and array catenaries 94 can be enormous. This drag limits the operational speed of the tow platform 90 and consequently the rate at which the ocean bottom can be explored. Because the tow platform 90 must be extremely powerful to tow the large arrays, the operational costs are very high. An improved tow configuration which reduces the total array drag and thus enables more rapid seismic surveys is needed in the art. Correspondingly, a reduction in the required tow platform scale could save the ocean exploration industry time and resources.

The following patents, for example, disclose towing cables and towed arrays, but do not disclose an asymmetric tow system with a streamlined composite cable having both an electrical and mechanical connection to each of plural towed arrays.

U.S. Pat. No. 4,317,185 to Thigpen et al.;
U.S. Pat. No. 5,089,668 to Harvey;
U.S. Pat. No. 5,274,603 to Zibilich, Jr. et al.;
U.S. Pat. No. 5,408,947 to Curto et al.;
U.S. Pat. No. 5,532,975 to Elholm; and
U.S. Pat. No. 5,913,280 to Nielsen et al.

Specifically, Thigpen et al. discloses a towing link consisting of a spaced-apart head and tailpieces. The headpiece includes a towing eye and a pair of lugs for receiving the stress members of a streamer and a lead-in cable. The tailpiece defines a pair of bores through which the stress member and electrical conductors of the two cables are inserted and sealed. A pair of mating connector plugs is provided to interconnect corresponding conductors of the two cables. The assembly is enclosed in a watertight plastic boot.

The patent to Harvey discloses a towed streamer having a buoyant core, a data bearer layer surrounding the buoyant core, an inner jacket layer formed of a resilient material surrounding the data bearer layer, and an outer jacket layer surrounding the inner jacket layer, wherein a series of longitudinally positioned strength members are embedded in the inner jacket layer to extend along the streamer to transmit tension along the streamer while the streamer is held in the inner jacket layer.

Zibilich, Jr. et al. discloses a marine seismic cable section with stress members and an internal wiring located within the cable section in a manner which reduces internal bending stresses upon the cable section when wound upon a storage reel. Stress members are at least near a horizontal plane passing through and at approximately equal distances from the center line of the cable section. Internal wiring is located in a vertical crisscrossing pattern down the length of the cable section. In one embodiment, the cable section contains an elastomeric filler material to retain and support stress members, internal wiring and other internal components at their desired location and to prevent damage to internal wiring and components due to external stress when the cable section is wound on a cable reel. Stress relief sections are also provided to further reduce bending stress within the seismic cable section in other embodiments. Additional embodiments to the cable section provide for adapting the cable section to a bottom cable which is laid on and couples with the sea floor to detect all three vectorial components of particle motion resulting from p- and s-waves and to detect p-waves with a hydrophone. Other embodiments provide for sealing and termination methods which are compatible with use of elastomer as a filler material for connecting detectors disposed within the cable section to internal wiring.

Curto et al. discloses a method and apparatus in marine seismic surveying for towing an optical-electrical towing cable (lead in) and seismic array (streamer cable) at a perpendicular distance from the centerline of the towing vessel using a short, flexible adapter cable section which optically and electrically connects the lead in to the streamer cable and which attaches to pivoting arms of a removable towing bracket which carries the bending loads.

The patent to Elholm discloses a positioning device for seismic equipment which is towed by a seismic vessel and is designed with a body part which is equipped with wings and rudders. For the control of wings and rudders, control means, preferably hydraulic or electrical means are used. The device further comprises a control unit for processing of signals which preferably operate exclusively on the basis of information from the vessel or the ship, instruments for use in the positioning of the device and a communication system for the communication between the vessel and the device and vice versa, preferably electrical, acoustic or optical. It is further equipped with attachment devices of one or more cables and floats, which are preferably provided at the front of the device, and preferably in the vicinity of the wing's attachment point to the device's body part as well as a power supply system.

Nielsen et al. discloses methods, systems, and towing bridles, provided to increase spread width, streamer separation, and number in marine seismic data acquisition.

The invention is applicable for towing seismic equipment behind a marine seismic data equipment handling vessel along a data acquisition path, the system comprising: a deflector attached to a deflector line; an equipment handling vessel attached to the deflector; a deflector line pulling vessel attached to the deflector line; and the marine seismic data equipment attached to the deflector line.

It should be understood that the present invention would in fact enhance the functionality of the above patents by providing a streamlined composite tow cable with both mechanical and electrical components therein for mechanically supporting and electrically connecting the towed arrays to a tow platform.

SUMMARY OF THE INVENTION

Therefore, it is an object of this invention to provide an asymmetric tow system for multiple linear arrays.

Another object of this invention is to provide an asymmetric tow system having a composite tow cable with direct structural and electrical connections to multiple linear arrays.

Still another object of this invention is to provide an asymmetric tow system which eliminates multiple individual linear array catenaries.

A still further object of the invention is to provide an asymmetric tow system for multiple linear arrays which reduces system complexity.

In accordance with one aspect of this invention, there is provided an asymmetric towing system for towing multiple linear arrays including a tow platform and a single composite tow cable extending from the tow platform. The single composite tow cable has the multiple linear arrays connected both mechanically and electrically thereto. The composite tow cable is shaped by a hard streamlined casing and houses a load bearing cable for mechanical connection to each array and plural individual array connections for establishing electrical communication between each array and the tow platform. A single depressor is connected to a distal end of the composite cable for spreading the composite cable in a substantially lateral direction from the tow platform.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to a system 10 which reduces an overall drag of a towed linear array. The basic system 10 is configured as shown in FIG. 2.

Figure 1:
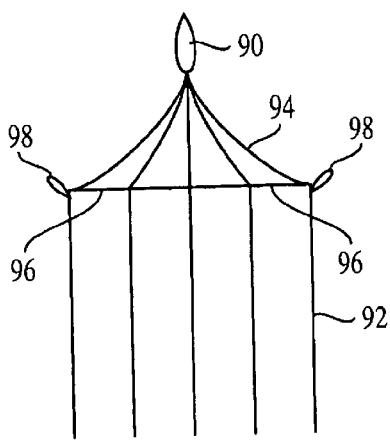
FIG. 1 is a schematic view of a multiple towed array system of the Prior Art.
Figure 2:
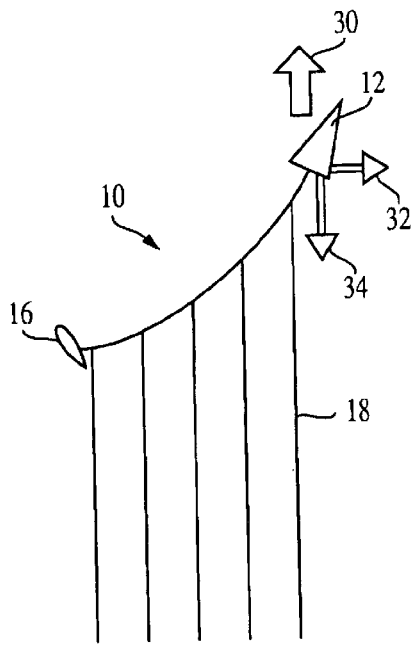
FIG. 2 is schematic diagram of an asymmetric towed array system according to a preferred embodiment of the present invention.

As illustrated in FIG. 2, the system 10 includes a tow platform 12 is provided for pulling the system 10. The tow platform 12 is generally a large ship with suitable cable handling equipment (not shown). A support cable 14 is connected directly to the tow platform 12 and is spread therefrom in a substantially lateral direction by a depressor member 16. Depressor members 16 are well known in the art. Plural towed arrays 18 are directly connected to the support cable 14 in a manner which will be further described below. Support cable 14 is preferably streamlined and made from composite materials.

Figures 3, 4:
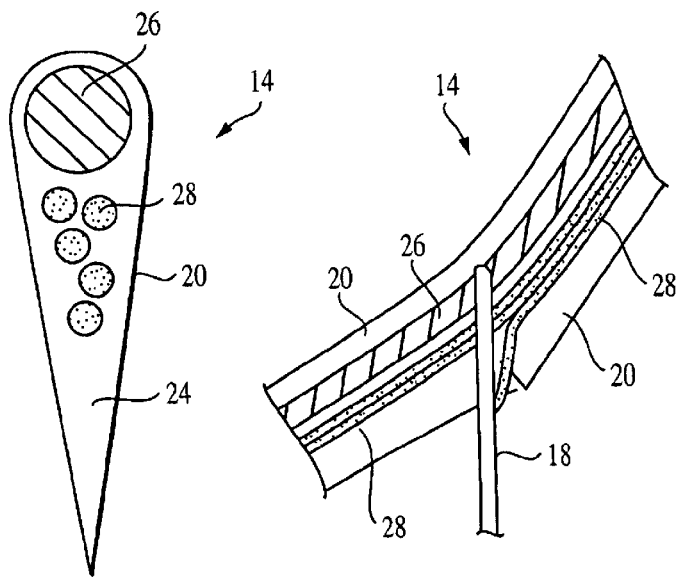
FIG. 3 is an end sectional view of a load bearing cable of the towed array system of the present invention.
FIG. 4 is a top sectional view of the load bearing cable of FIG. 3.

Specifically, the support cable 14 is shown in detail in FIGS. 3 and 4. From these Figures, it can be seen that the support cable 14 is streamlined via its drag-reducing wing shaped casing 20 having a nose 22 and tail 24 portion. The shape of the casing 20 aids in the accommodation of elements therein. In particular, a load bearing cable 26 is encased along a length of the casing 20 and at the nose portion 22 thereof. Behind the load bearing cable 26 are a plurality of individual array connections 28. These individual array connections 28 will connect with a respective one of the towed arrays 18 in order to transmit signals from the linear array 18 through the composite cable 14 to the tow platform 12. These signals can be electrical or optical signals. The linear array 18 is additionally mechanically connected to the load bearing cable 26.

Thus, the support cable 14 forms the catenary between the tow platform 12 and the depressor 16. This cable is an assemblage of the array connections 28 for each individual array 18 and a load bearing cable 26. The cable components are encapsulated by a hard cable fairing or casing 20 shaped into a streamlined form.

Referring again to FIG. 2, the tow platform 12 will move forward at 30 with the ship axis at a slight angle to the direction of the assembly motion. This crabbing motion is required to compensate for the lift (shown as direction 32) generated by the depressor 16 used to spread the system 10 apart. The action of a ship thruster alone might be capable of providing the required force vector, however, stabilizing fins or a keel (not shown) would be another means of generating the required horizontal force. Even without a large keel, the ship hull itself will generate some lift when operated in this crabbing motion.

The arrays 18 are very long linear arrays which can contain hydrophones and seismic transmitters (not shown). There is nothing unique about these arrays 18 for the disclosed system except that they structurally join and are in communication with the support cable 14, transmitting their drag load to and communicating with this cable. The signal connections 28 continue inside of the support cable 14 to the tow platform 12.

The system operation is not unlike known towed cable systems. The depressor 16 is deployed which pulls the support cable 14 across the flow. The combined drag of the arrays 18 and the support cable 14 force the cable into a catenary. The tow platform 12 must produce a force to overcome the total drag 34 of the cable system and a lift force 32 to overcome the tangential drag on the support cable 14 and the lift produced by the depressor 16. As explained, the normal lift produced by the ship hull during crabbing motion, lift produced by stabilizers and the ship keel, and the ship thrust can be combined to generate the required horizontal forces.

The proposed concept is based on replacement of a dual depressor system with a single depressor system. The individual cable catenaries are replaced with a single streamlined support cable, and the cross-cables are eliminated from the system. The thrust of the ship and hull lift forces are used to compensate for the lift produced by the depressor.

The proposed system configuration will provide an improved multiple towed array design by eliminating multiple individual catenaries, eliminating cross cables which are normal to the direction of ship motion, reducing the number of required depressors to one, reducing the system complexity, and reducing the number of wetted cables in cross-flow thus making hard fairings a reasonable engineering solution to drag reduction.

The system configuration presented herein can be configured in many ways in order to achieve the desired result. One alternate configuration includes deployment of two assemblies, each from laterally opposite sides of a tow platform, in a symmetric configuration, thereby eliminating the need for ship generated lift. Another alternate configuration is for two ships (tow platforms) to work in tandem, with a connecting cable between them to balance the horizontal loads. These are not exclusive alternatives, and are suggested only as examples of alternative configurations of the present invention.

In view of the above detailed description, it is anticipated that the invention herein will have far reaching applications other than those of towed linear seismic arrays.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. An asymmetric multiline towed array for towing by a tow platform comprising:
    a support cable having a first end for connection to the tow platform and an opposing distal end, said support cable including both mechanical and signal components;
    at least one array connected to said mechanical and signal components of said support cable; and
    a depressor connected to the distal end of said support cable for spreading said support cable in a substantially lateral direction from one side of the tow platform;
    wherein the signal component of said support cable includes at least one array connector for communications connection with said array.

2. The system according to claim 1 wherein said support cable is streamlined in shape to include a rounded leading nose portion and a tapered tail portion trailing the nose portion.

3. The system according to claim 1 wherein the mechanical component of said support cable includes a load bearing cable housed therein along an entire length thereof for providing a load bearing mechanical connection between said support cable and said depressor.

4. The system according to claim 2 wherein the mechanical component of said support cable includes a load bearing cable housed therein along an entire length thereof for providing a load bearing mechanical connection between said support cable and said depressor.

5. The system according to claim 4 further comprising a casing formed in a streamlined shape around said support cable.

6. The system according to claim 1 wherein said support cable is streamlined in shape to include a rounded leading nose portion and a tapered tail portion trailing the nose portion and wherein at least one array connector is in the tail portion of said support cable.

7. The system according to claim 1 further comprising a casing formed in a streamlined shape around said support cable.

8. The system according to claim 2 wherein said load bearing cable is positioned at the nose portion of said support cable.

9. An asymmetric multiline towed array system for towing by a tow platform comprising:
    a single support cable having a first end for connection to the tow platform and an opposing distal end, said single support cable including both mechanical and signal components;
    a plurality of array lines connected to said mechanical and signal components of said single support cable; and
    a single depressor connected to the distal end of said single support cable for spreading said single support cable in a substantially lateral direction from one side of the tow platforms;
    wherein the signal component of said single support cable includes at least one array connector for communications connection with each said array line.

10. The system according to claim 9 wherein said single support cable is streamlined in shape to include a rounded leading nose portion and a tapered tail portion trailing the nose portion.

11. The system according to claim 9 wherein the mechanical component of said single support cable includes a load bearing cable housed therein along an entire length thereof for providing a load bearing mechanical connection between said single support cable and said single depressor.

12. The system according to claim 10 wherein the mechanical component of said single support cable includes a load bearing cable housed therein along an entire length thereof for providing a load bearing mechanical connection between said single support cable and said single depressor.

13. The system according to claim 9 further comprising a casing formed in a streamlined shape around said single support cable.

14. The system according to claim 10 wherein said load bearing cable is positioned at the nose portion of said single support cable.

15. The system according to claim 9 wherein said single support cable is streamlined in shape to include a rounded leading nose portion and a tapered tail portion trailing the nose portion and wherein at least one of said array connectors is in the tail portion of said single support cable.

* * * * *